3,287,334
POLYMERIZATION CATALYST SYSTEMS COMPRISING TRIETHYL ALUMINUM AND DICHLOROTITANIUM PHTHALOCYANINE, WITH OR WITHOUT AN AMINE
Edward L. Kropa, Columbus, Ohio, assignor, by mesne assignments, to W. R. Grace & Co., New York, N.Y., a corporation of Connecticut
No Drawing. Filed Apr. 20, 1961, Ser. No. 104,243
4 Claims. (Cl. 260—86.7)

This invention relates to a process for forming polymers and copolymers of methyl methacrylate and styrene in the presence of a novel catalyst.

This application is a continuation-in-part of my previous application filed February 16, 1960, having Serial No. 8,936, now abandoned.

It is known that methyl methacrylate can be polymerized in the presence of aluminum triethyl in a non-polar solvent such as toluene at 0–90° C. See Belgian Patent 566,713. It is also known to polymerize methyl methacrylate in the presence of a catalyst consisting essentially of $TiCl_4$ and $Mg(C_2H_5)_2$, which has been subjected to a premixing and aging period at room temperature prior to polymerization use. Additionally, it is known to polymerize styrene in an inert hydrocarbon solvent in the presence of a catalyst consisting of $TiCl_4$ and $Al(C_2H_5)_3$. The aforesaid latter system yielded no polymer under the above reaction conditions when methyl methacrylate was the monomer to be polymerized.

Surprisingly, it has now been found possible to form polymers and copolymers of methyl methacrylate and styrene in an inert hydrocarbon solvent at a temperature in the range 25–125° C. by subjecting the aforesaid monomers to the action of a catalyst consisting essentially of the reaction products of aluminum triethyl and dichlorotitanium phthalocyanine. In a preferred embodiment of this invention an amine is added to the catalyst system, as will be more fully explained by an example hereinafter.

The exact nature of this novel catalyst system based on the phthalocyanine nucleus is not known. One theory is that since metal phthalocyanines have gross chemical resemlance to the porphyrins and since porphyrins are known to be the active or the prosthetic part of enzymes, it is possible that in some way the phthalocyanine combines chemically with a portion of the monomer to yield an enzyme entity containing polymer and phthalocyanine. In this system the polymer behaves as the template, or the orienting moiety, and the phthalocyanine acts as the functional or prosthetic part inducing chemical change. The fact that phthalocyanines are semi-conductors and are capable of electron transfer lends credence to this hypothesis. However, I do not wish to be bound by any theory in regard to the catalyst system of the instant invention. Suffice it to say that the reaction products of dichlorotitanium phthalocyanine and aluminum triethyl will catalyze polymerizations and copolymerizations of methyl methacrylate and styrene under the conditions disclosed herein.

The amount of catalyst used to polymerize the aforesaid monomers is not critical. Relevantly small amounts are adequate to form relatively large amounts of polymer or copolymer. In general, the practical range is 0.001 to 1 g. of catalyst per gram of monomer polymerized. Larger amounts of catalyst are operable but unnecessary.

The ratio of dichlorotitanium phthalocyanine to aluminum alkyl is not critical. Mole ratios of dichlorotitanium phthalocyanine:aluminum triethyl of 1:1 to 20 are operable; a preferred range is respectively 1:3 to 10. To insure the catalytic activity of the catalyst of this invention, it is necessary that the catalyst be maintained free from contact with contaminants which tend to deactivate it thereby decreasing or terminating its polymerizing ability. Such contaminants include oxygen, moisture, carbon dioxide and the like. To preserve freedom from contaminants, the catalyst reactants are stored and transferred to the polymerization reactor under a blanket of a gas inert to the catalyst. In the examples stated herein, pure lampgrade nitrogen is used as the blanket; however, the noble gases, especially argon, helium, and neon are equally suitable.

Although no preconditioning of the catalyst reactants, either alone or together, is necessary to polymerize methyl methacrylate of styrene, ball milling of the dichlorotitanium phthalocyanine catalyst reactant in an inert atmosphere, e.g. nitrogen, enhances the catalytic activity of the system.

The catalyst reactants are usually added separately to the polymerization reactor. For ease of handling the dichlorotitanium phthalocyanine is preferably, but not necessarily, added as a dispersion in a portion of the solvent for the polymerization reaction.

The polymerization reaction is carried out in a solvent. The solvent should be one which is inert to the reaction, remains liquid under the polymerization conditions of temperature and pressure employed and which is free of contaminants which retard or inhibit the polymerization reaction per se, or have an adverse effect on catalyst activity. A preferred class of inert solvents are liquid hydrocarbon reaction mediums, e.g., pentane, hexane, heptane, cyclohexane, octane, benzene, xylene, toluene, and the like.

*Example 1*

The reactor consisted of a four-necked 500 ml. flask equipped with a condenser, stirrer, thermometer, nitrogen gas inlet and neoprene diaphragm. A hypodermic syringe was injected through the neoprene diaphragm to charge under a nitrogen blanket 0.001 mole of dichlorotitanium phthalocyanine (0.63 gram in 50 cc. n-heptane) dried for 12 hours in a vacuum oven at 60° C. Stirring was commenced and the flask heated to 70° C. 0.29 mole of methyl methacrylate and 0.003 mole aluminum triethyl were then added and the reaction was continued for 5 hours at 85° C. The flask and contents were cooled and 100 cc. methanol were added. The methanol was decanted and the solid polymer was added to 500 cc. acetone and allowed to stand for 16 hours at room temperature. The acetone solution was decanted from the remaining solid polymer and the acetone evaporated from said solution. Both portions of the polymer product were ground and dried in a vacuum oven overnight at 50° C. The acetone-soluble methyl methacrylate polymer weighed 9 grams and had a melting point in the range 135–145° C. The acetone-insoluble polymer product weighed 17.4 grams and had a melting point range of 145–155° C. These melting points are characteristic of polymethylmethacrylate which is more crystalline and more stereospecific than polymer prepared by radical initiated catalysts. The total dried polymer weighed 26.4 grams representing a 91.1% conversion of the methyl methacrylate monomer.

*Example 2*

The procedure of Example 1 was followed except that styrene (0.43 mole), was substituted for the methyl methacrylate monomer as a reactant. The polystyrene product was extracted in a Soxhlet extractor for 8 hours. The acetone soluble polymer weighed 0.3 gram and melted at 80–83° C. The acetone insoluble polymer weighed 1.7 grams and melted at 160–170° C. The melting point of the latter polymer indicated that it is more crystalline and more stereospecific than polystyrene prepared by radical initiation.

Example 3

The procedure in Example 2 was followed except that 5 minutes after 0.43 mole styrene was added, 0.09 mole methyl methacrylate was added. After a 5 hour reaction period, the copolymer product was separated into an acetone-soluble portion and an acetone-insoluble portion by the Soxhlet procedure in Example 2. The dried acetone-soluble portion weighed 1.3 g. and had a melting point of 115–130° C. The dried acetone-insoluble portion weighed 5.0 g. and had a melting point range of 150–175° C.

Example 4

The reactor consisted of a four-necked 500 ml. flask equipped with condenser, stirrer, thermometer, nitrogen gas inlet, neoprene diaphragm on a glass-cloth heating mantle. Dichlorotitanium phthalocyanine (0.002 mole) was charged into the nitrogen filled reaction flask, followed by 50 cc. dry n-heptane. Stirring was commenced and the flask heated to 70° C. Triethyl aluminum (0.004 mole, 2.5 cc. of 1.6 n-heptane solution) was injected into the flask with a hypodermic. Styrene (0.43 mole) then was injected and the flask heated to 85° C. The flask was cooled in an ice-water bath after 5 hours reaction time, and 100 cc. methanol was added. The solid polymer was ground in a Waring Blendor with methanol and filtered. The polymer was refluxed for 6 hours with a 10% HCl-methanol solution, washed with methanol until neutral, and dried. The polymer was then extracted with acetone in a Soxhlet extractor for 8 hours. The acetone-soluble polymer weighed 0.7 g. and melted at 80–83° C. The acetone insoluble polymer weighed 3.5 g. and melted at 165–170° C.

Example 5

The procedure in Example 4 was followed except that 2 minutes after the 0.43 mole styrene was added, 0.21 mole methyl methacrylate was added. After a 5 hour reaction period the copolymer product was purified and separated into an acetone-soluble and acetone-insoluble portion by the Soxhlet procedure described in Example 4. The dried acetone-soluble portion weighed 2.5 g. and had a melting point of 110–125° C. The dried acetone-insoluble portion weighed 9.5 g. and had a melting point range of 150–170° C.

The following example shows the increased yield obtainable when an amine is added to the catalyst system.

Example 6

The reactor consisted of a four-necked 500 ml. flask equipped with condenser, stirrer, thermometer, nitrogen gas inlet, neoprene diaphragm and glass-cloth heating mantle. Dichlorotitanium phthalocyanine (0.002 mole) was charged into the nitrogen filled flask, followed by 50 cc. dry n-heptane. Stirring was commenced and the flask was heated to 70° C. Triethylaluminum (0.006 mole, 3.8 cc. of 1.6 n-heptane solution) was injected into the flask with a hypodermic followed by a tri-n-butylamine (0.002 mole). Styrene (0.43 mole) was then injected and the flask heated to 85° C. The reactor flask was cooled in an ice-water bath after a 5 hour reaction, and 100 cc. methanol was added. The solid polymer was ground in a Waring Blendor with methanol and filtered. The polymer was refluxed with a 10% HCl-methanol solution, washed with methanol until neutral and dried. The polymer was then extracted with acetone in a Soxhlet extractor for 8 hours. The acetone-soluble polymer weighed 0.5 g. and melted at 80–83° C. The acetone insoluble polymer weighed 8.1 g. and melted at 160–175° C.

A comparison of Example 6 and Example 2 shows that a fourfold increase in acetone insoluble polystyrene is obtained when an amine is added to the catalyst system.

The amount of the amine added is not critical, preferably the amount of amine added is on a 1:1 mole ratio with the dichlorotitanium phthalocyanine. However, we have found that an amine:dichlorotitanium phthalocyanine mole ratio of .1 to 10:1 is operable.

Examples of operable amines include di-isopropylamine, 2-ethylhexylamine, diphenylamine, trioctylamine, aniline, and the like.

The polymers and copolymer of methyl methacrylate and styrene obtained by the practice of this invention can be used as films, coatings and moldings, and other forms wherein the properties of a crystallizable polymer are beneficial.

I claim:
1. The process of polymerizing a member of the group consisting of methyl methacrylate, styrene and mixtures thereof which comprises subjecting said group member in an inert atmosphere in a liquid hydrocarbon reaction medium at a temperature in the range 25–125° C. to the action of a catalytic amount of a catalyst consisting essentially of the reaction product formed by admixing dichlorotitanium phthalocyanine and aluminum triethyl in a mole ratio in the range 1:1 to 20 respectively.

2. The process according to claim 1 wherein an amine is admixed with the catalyst in an amount sufficient to give a dichlorotitanium phthalocyanine:amine mole ratio in the range 1:0.1 to 10 respectively.

3. A polymerization catalyst consisting essentially of the reaction product formed in an inert atmosphere on admixture of dichlorotitanium phthalocyanine and aluminum triethyl in a mole ratio in the range 1:1 to 20 respectively.

4. The catalyst according to claim 3 wherein an amine is added to the catalyst in an amount sufficient to give a dichlorotitanium phthalocyanine:amine mole ratio in the range of 1:0.1 to 10 respectively.

References Cited by the Examiner

UNITED STATES PATENTS

| | | | |
|---|---|---|---|
| 2,234,076 | 3/1941 | Gumlich et al. | 260—82.5 |
| 2,987,500 | 6/1961 | Rosetti | 260—89.5 |

FOREIGN PATENTS 566,713  4/1958  Belgium.

OTHER REFERENCES

Korsunovskii: Chem. Abs., vol. 53 (1959), page 3901b.

Lubs: Chemistry of Synthetic Dyes and Pigments, Waverly Press, Inc., Baltimore, Md. (1955), pages 580–583.

Schildknecht: Vinyl and Related Polymers, John Wiley & Sons, Inc., New York, N.Y. (1959), page 56.

JOSEPH L. SCHOFER, *Primary Examiner.*

JAMES A. SEIDLECK, *Examiner.*

H. WONG, *Assistant Examiner.*